US 8,268,023 B2

(12) United States Patent
Anand et al.

(10) Patent No.: US 8,268,023 B2
(45) Date of Patent: Sep. 18, 2012

(54) WATER GAS SHIFT REACTOR SYSTEM FOR INTEGRATED GASIFICATION COMBINED CYCLE POWER GENERATION SYSTEMS

(75) Inventors: Ashok Kumar Anand, Schenectady, NY (US); Mahendhra Muthuramalingam, Bangalore Karnataka (IN); Jegadeesan Maruthamuthu, Bangalore Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/766,979

(22) Filed: Apr. 26, 2010

(65) Prior Publication Data

US 2011/0260113 A1    Oct. 27, 2011

(51) Int. Cl.
*B01J 7/00* (2006.01)
*C01B 3/36* (2006.01)
*C01B 6/24* (2006.01)
*C01B 3/12* (2006.01)

(52) U.S. Cl. ............ 48/61; 48/197 R; 423/644; 423/655
(58) Field of Classification Search .......... 48/61, 197 R; 423/644, 655
See application file for complete search history.

(56) References Cited

U.S. PATENT DOCUMENTS

| | | | |
|---|---|---|---|
| 3,850,841 A | 11/1974 | Aldridge et al. | |
| 4,110,359 A * | 8/1978 | Marion | 518/703 |
| 4,881,366 A | 11/1989 | Nurse | |
| 4,999,992 A | 3/1991 | Nurse | |
| 4,999,995 A | 3/1991 | Nurse | |
| 6,505,467 B1 | 1/2003 | Fjellhaug et al. | |
| 2009/0019767 A1* | 1/2009 | Abughazaleh et al. | 48/61 |
| 2009/0211155 A1 | 8/2009 | Avagliano et al. | |
| 2009/0235822 A1 | 9/2009 | Anand et al. | |
| 2010/0031660 A1 | 2/2010 | Narayan et al. | |
| 2010/0074839 A1 | 3/2010 | Drnevich | |

FOREIGN PATENT DOCUMENTS

| | | |
|---|---|---|
| DE | 38 41 619 | 6/1990 |
| DE | 38 41 619 A1 | 6/1990 |
| NO | 20 075 953 | 1/2008 |
| NO | 20 075 953 A | 1/2008 |
| WO | 00/03126 A1 | 1/2000 |
| WO | 200001326 | 1/2000 |

OTHER PUBLICATIONS

Supplemental European Search Report for EP1116343 dated Nov. 4, 2011.

* cited by examiner

*Primary Examiner* — Matthew Merkling
(74) *Attorney, Agent, or Firm* — Sutherland Asbill & Brennan LLP

(57) ABSTRACT

The present application thus provides an integrated gasification combined cycle system. The integrated gasification combined cycle system may include a water gas shift reactor system and a heat recovery steam generator. The water gas shift reactor system may include a recirculation system with a recirculation heat exchanger to heat a flow of syngas. The heat recovery steam generator may include a diverted water flow in communication with the recirculation heat exchanger.

16 Claims, 3 Drawing Sheets

US 8,268,023 B2

WATER GAS SHIFT REACTOR SYSTEM FOR INTEGRATED GASIFICATION COMBINED CYCLE POWER GENERATION SYSTEMS

TECHNICAL FIELD

The present application relates generally to an integrated gasification combined cycle ("IGCC") power generation system and more particularly relates to an IGCC power generation system with an improved water gas shift reactor system for use therewith.

BACKGROUND OF THE INVENTION

Known IGCC power generation systems may include a gasification system that is integrated with at least one power producing turbine system. For example, known gasifiers may convert a mixture of fuel, air or oxygen, steam, and other additives into an output of a partially combusted gas, typically referred to as a "syngas". These hot combustion gases are supplied to the combustor of a gas turbine engine. The gas turbine engine, in turn, powers a generator for the production of electrical power or drive another type of load. Exhaust from the gas turbine engine may be supplied to a heat recovery steam generator ("HRSG") so as to generate steam for a steam turbine. The power generated by the steam turbine also may drive an electrical generator or another type of load. Similar types of power generation systems may be known.

The gasification process may use a water gas shift reactor. The basic water gas shift reaction is as follows: $CO+H_2O<->CO_2+H_2$. In order to improve the shift reaction, high pressure steam may be mixed with the raw syngas entering the water gas shift reactor so as to increase the $H_2O/CO$ ratio. The source of the steam is generally taken from the bottoming cycle or from cooling the syngas in a high/low temperature gas cooling section. The reaction also is temperature sensitive.

The efficiency of the overall IGCC system with $CO_2$ capture, however, may be reduced given the high pressure steam requirements for the water gas shift reactor. Specifically, the high pressure steam taken for the saturation of the raw syngas involves a performance penalty in that the steam is not available for expansion work in a steam turbine. The diversion therefore may reduce overall system efficiency, net output, and heat rate.

There is therefore a desire therefore for an improved integrated gas combined cycle power generation system with $CO_2$ capture. Such a system preferably may maintain adequate $CO_2$ capture while increasing overall system efficiency and performance.

SUMMARY OF THE INVENTION

The present application thus provides an integrated gasification combined cycle system. The integrated gasification combined cycle system may include a water gas shift reactor system and a heat recovery steam generator. The water gas shift reactor system may include a recirculation system with a recirculation heat exchanger to heat a flow of syngas. The heat recovery steam generator may include a diverted water flow in communication with the recirculation heat exchanger.

The present application further provides a method of operating an integrated combined cycle gasification system having one or more water gas shift reactors and a heat recovery steam generator. The method may include the steps of providing a recirculating water flow in communication with an incoming flow of syngas, diverting a high pressure water extraction from the heat recovery steam generator, exchanging heat between the high pressure water extraction and the recirculating water flow, flowing the syngas to the water gas shift reactors, and increasing the moisture content of the flow of syngas The present application further may provide an integrated gasification combined cycle system. The integrated gasification combined cycle system may include a water gas shift reactor system with one or more water gas shift reactors and a heat recovery steam generator. The water gas shift reactor system may include a recirculation system with a recirculation heat exchanger to heat a flow of syngas. The heat recovery steam generator may include a high pressure section and a diverted high-pressure water flow in communication with the recirculation heat exchanger.

These and other features and improvements of the present application will become apparent to one of ordinary skill in the art upon review of the following detailed description when taken in conjunction with the several drawings and the appended claims.

DETAILED DESCRIPTION

Figure 1:
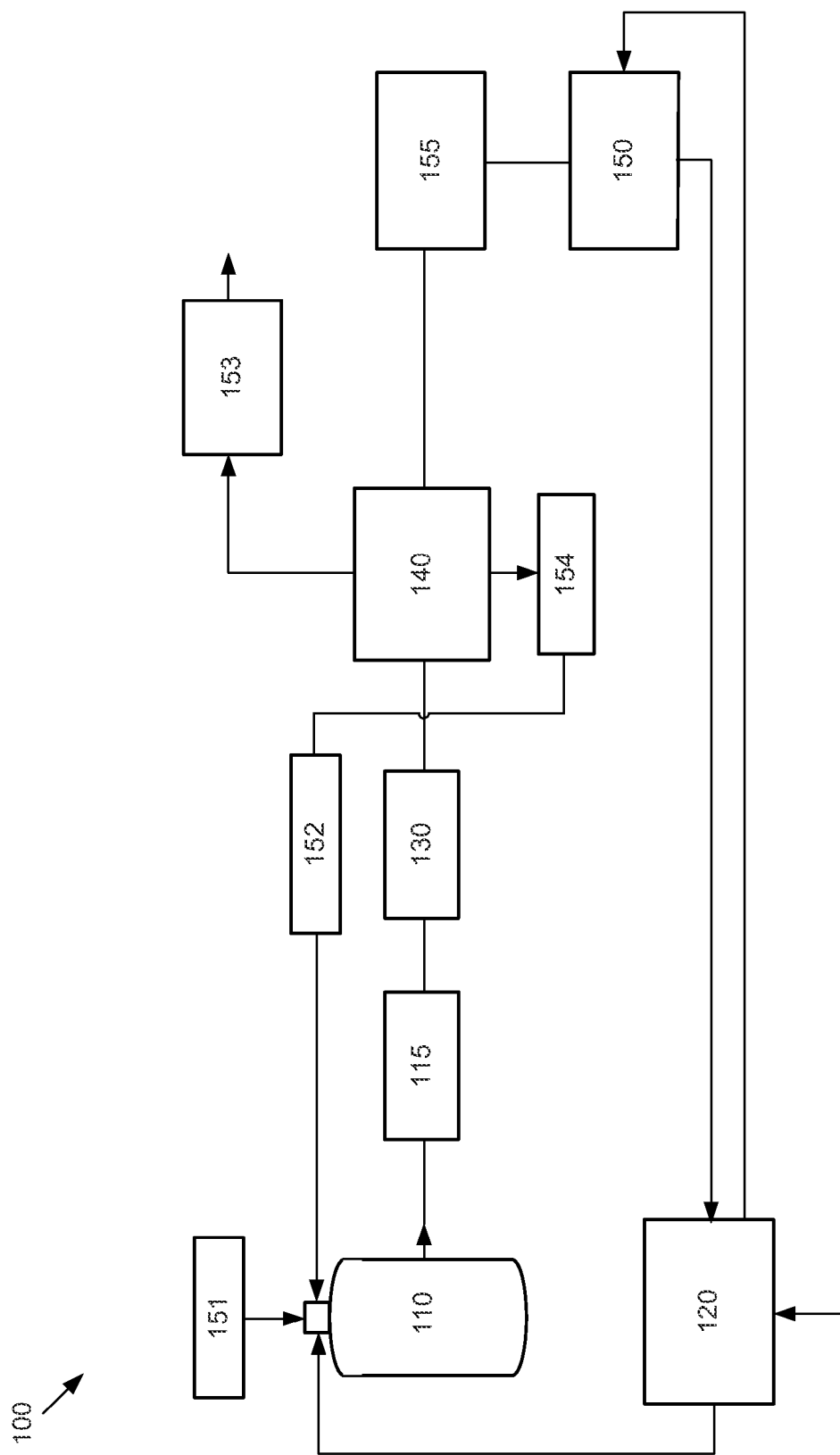
FIG. 1 is a schematic view of an IGCC power generation system with $CO_2$ capture.

Referring now to the drawings, in which like numerals refer to like elements throughout the several views, FIG. 1 shows an IGCC power generation system 100 with $CO_2$ capture. The IGCC system 100 may include a high pressure radiant-conductive gasifier 110 to maximize sensible heat recovery; a radiant syngas cooler 115; an air separation unit 120 to produce oxygen of the desired purity as may be required for gasification using elevated pressure air separation with a partial air extraction from the gas turbine; one or more catalytic water gas shift reactors in a water gas shift reactor system 130 to produce a predominantly $H_2$—$CO_2$ rich gas; an acid gas removal system 140 for additional product gas cleaning with $CO_2$ removal; and power generation using an advanced syngas fueled gas turbine power cycle 150. The IGCC system 100 also may include coal preparations 151; $CO_2$ recycle compression 152; $CO_2$ compression 153; a sulfur recovery unit with a tail gas treatment unit 154, a clean syngas heating unit 155; and other components as may be desired. Other configurations also may be used herein.

Figure 2:
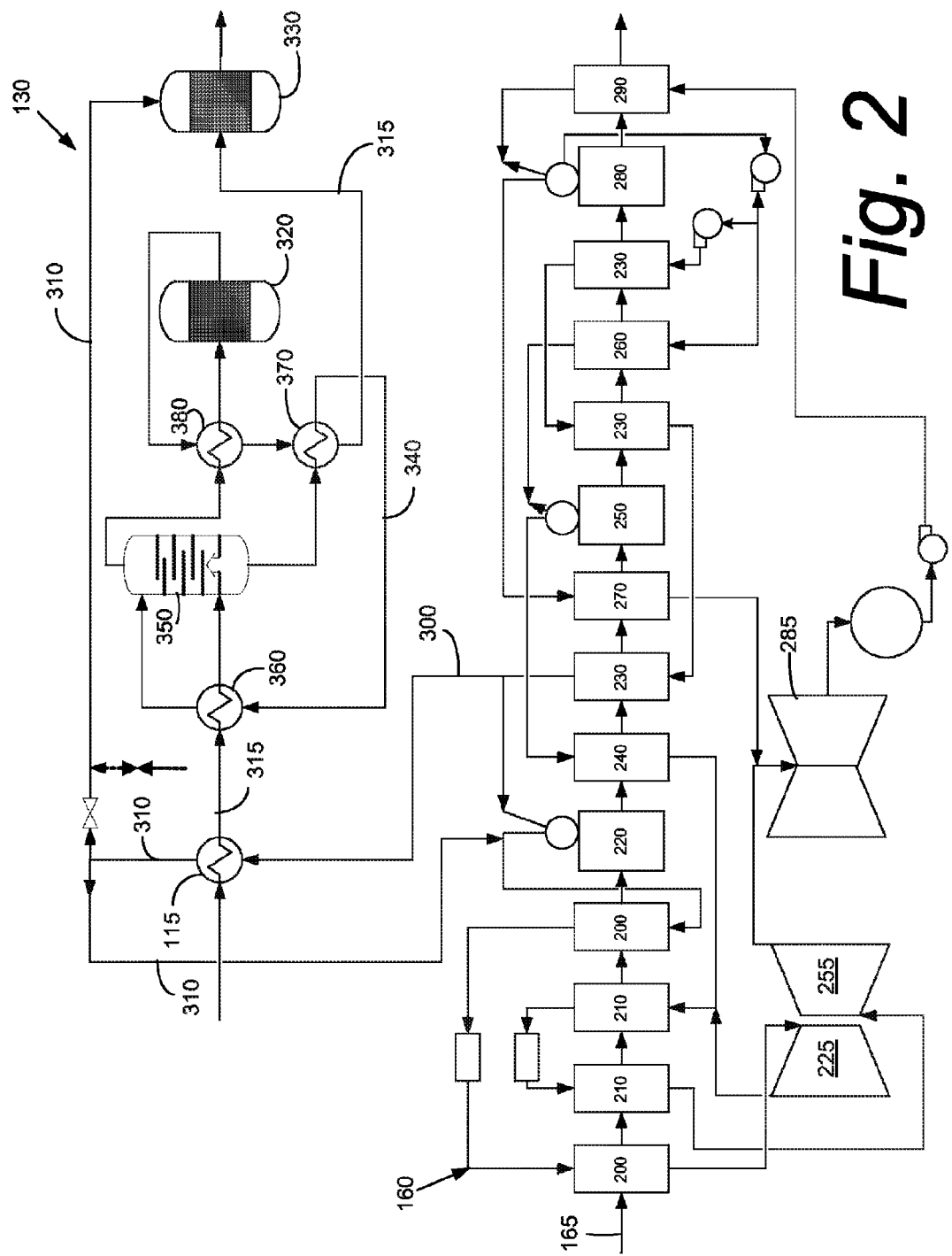
FIG. 2 is a schematic view of a low temperature gas cooling section using a HRSG of a known IGCC system.

FIG. 2 shows a portion of the IGCC system 100 described above. Specifically, FIG. 2 shows the combination of the radiant syngas cooler 115 and the water gas shift reactor system 130 in combination with a heat recovery steam generator ("HRSG") 160. Exhaust gasses 165 from the gas turbine of the combined cycle power block 150 may be supplied to the HRSG 160 for recovering waste heat from the exhaust gases. The HRSG 160 may include a high pressure ("HP") section 225, an intermediate pressure ("IP") section 255, and a low pressure ("LP") section 285. The HRSG 160 may be configured to transfer progressively lower grade heat from the exhaust gases 165 to water circulation for each progressively lower pressure section. Other configurations may be used herein.

The high pressure section 225 may include one or more high pressure super heaters 200, a high pressure evaporator 220, and one or more high pressure economizers 230. The economizers 230 typically preheat water before it is converted to steam in, for example, the evaporator or elsewhere. Likewise, the intermediate pressure section 255 may include one or more intermediate pressure reheaters 210, an intermediate pressure super heater 240, an intermediate pressure evaporator 250, and an intermediate pressure economizer 260. Further, the low pressure section 285 may include a low pressure super heater 270, a low pressure evaporator 280, and a low pressure economizer 290. Other components and configurations may be used herein.

The radiant syngas cooler 115 may heat a high pressure water extraction 300 from one of the high pressure economizer 230 or otherwise into a high pressure steam flow 310. The high pressure steam flow 310 may be returned to the high pressure evaporator 220 or the high pressure steam flow 310 may be mixed with a flow of raw syngas 315 entering the water gas shift reactor system 130. In this example, the water gas shift reactor system 130 may include a first water gas shift reactor 320 and a second water gas shift reactor 330. Any number of reactors may be used herein depending upon the amount of $CO_2$ to be captured from the overall system. The high pressure steam flow 310 saturates the syngas flow 315 to improve the $H_2O/CO$ ratio in either or both of the reactors 320, 330. Optionally, heat energy also could be obtained from steam turbine extractions at the high, intermediate, or low pressure sections to improve the $H_2O/CO$ ratio.

The water gas shift reactor system 130 also may include a water recirculation system 340. The water recirculation system 340 may be used to heat the flow of syngas 315 in a column 350 or otherwise. The water flow within the water recirculation system 340 may be warmed via a number of gas/water heat exchangers. In this case, a first gas/water heat exchanger 360 and a second gas/water heat exchanger 370 may be used. A gas/gas heat exchanger 380 also may be used. Any number of heat exchangers may be used herein. Other components and configurations also may be used herein.

Figure 3:
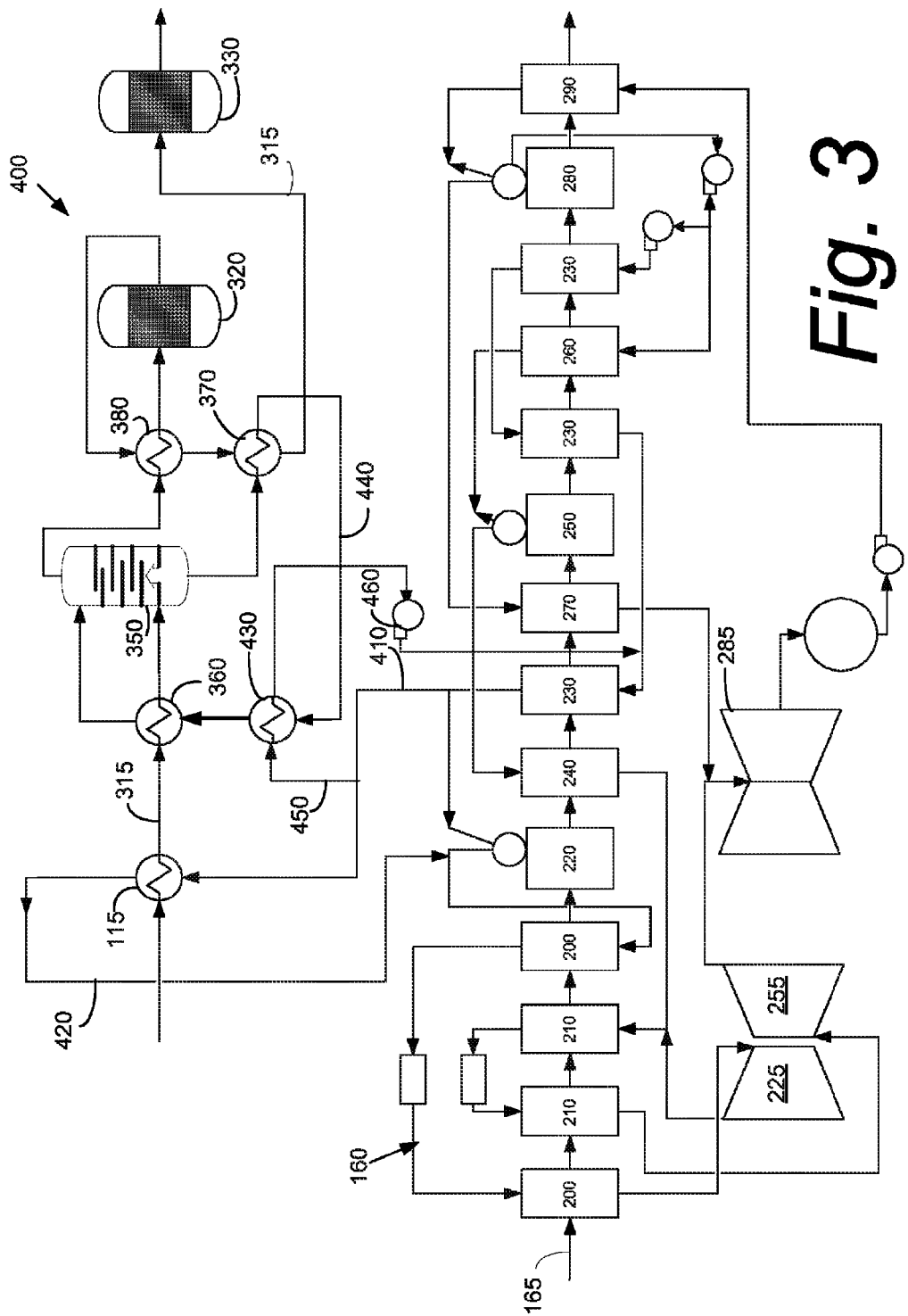
FIG. 3 is a schematic view of a low temperature gas cooling section using a HRSG as may be described herein.

FIG. 3 shows an IGCC system 390 with a water gas shift reactor system 400 as may be described herein. The water gas shift reactor system 400 is again tied into the HRSG system 160. Specifically, a high pressure water extraction 410 is taken from one high pressure economizer 230. The high pressure water extraction 410 again flows through the radiant syngas cooler 105 and is turned into a high pressure steam flow 420. All of the high pressure steam flow 420, however, is returned to the high pressure evaporator 220 instead of being forwarded to one of the reactors 320, 330 of the water gas shift reactor system 400.

Rather, a recirculation heat exchanger 430 warms a recirculation flow 440 in a recirculation system 445 of the water gas shift reactor system 400. As above, the recirculation flow 440 flows through the first and second heat exchangers 360, 370 and the column 350. The recirculation heat exchanger 430 is fed from a diverted water flow 450 of the high pressure water extraction 410. The diverted water flow 450 passes through the recirculation heat exchanger 430 and then is returned to the high pressure economizer 230. A diversion flow pump 460 also may be used thereon. Other configurations may be used herein.

The recirculation flow 440 thus may be heated using the waste heat available from the high pressure economizer 230 or otherwise. The recirculation flow 440 in turn preheats an incoming flow of the raw syngas 315 as it enters the reactors 320, 330. As such, the need for the high pressure steam flow 420 directed to the reactors 320, 330 may be eliminated and/or at least reduced. The high pressure steam flow 420 thus is available for useful work while preheating the flow of the raw syngas 315 by the high pressure water extraction 410 increases the capacity of the syngas to hold moisture. As such, the overall output of the IGCC system 100 may be improved by using the high pressure water extraction 410 instead of the high pressure steam flow 420. For the same saturation content, a lower shift conversion may be possible.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An integrated gasification combined cycle system, comprising:
   a water gas shift reactor system;
   the water gas shift reactor system comprising a recirculation system;
   the recirculation system comprising a recirculation loop with a water/water heat exchanger and one or more gas/water heat exchangers to exchange heat with a flow of syngas;
   a heat recovery steam generator for recovering heat from exhaust gasses from a gas turbine engine, the heat recovery steam generator including a water extraction portion; and
   the heat recovery steam generator comprising a diverted water flow from the water extraction portion to the recirculation loop water/water heat exchanger to heat the recirculation loop.

2. The integrated gasification combined cycle system of claim 1, wherein the water gas shift reactor system comprises one or more water gas shift reactors.

3. The integrated gasification combined cycle system of claim 1, wherein the heat recovery steam generator comprises a high pressure section.

4. The integrated gasification combined cycle system of claim 3, wherein the high pressure section comprises one or more high pressure super heaters, one or more evaporators, and/or one or more economizers.

5. The integrated gasification combined cycle system of claim 3, wherein the high pressure section comprises one or more economizers in communication with the diverted water flow.

6. The integrated gasification combined cycle system of claim 1, wherein the diverted water flow comprises a high pressure water extraction.

7. The integrated gasification combined cycle system of claim 6, further comprising a syngas cooler in communication with the high pressure water extraction to create a high pressure steam flow.

8. The integrated gasification combined cycle system of claim 7, wherein the high pressure steam flow is in communication with the heat recovery steam generator.

9. The integrated gasification combined cycle system of claim 8, wherein the heat recovery steam generator comprises a high pressure evaporator and wherein the high pressure evaporator is in communication with the high pressure steam flow.

10. The integrated gasification combined cycle system of claim 1, wherein the recirculation system comprises one or more gas/gas heat exchangers to heat the flow of syngas.

11. The integrated gasification combined cycle system of claim 1, further comprising a diversion flow pump downstream of the recirculation loop water/water heat exchanger.

12. An integrated gasification combined cycle system, comprising:

a water gas shift reactor system with one or more water gas shift reactors;

the water gas shift reactor system comprising a recirculation system;

the recirculation system comprising a recirculation loop with a water/water heat exchanger and one or more gas/water heat exchangers to exchange heat with a flow of syngas;

a heat recovery steam generator for recovering heat from exhaust gasses from a gas turbine engine; and the heat recovery steam generator comprising a high pressure section having a diverted high pressure water flow in communication with the recirculation loop water/water heat exchanger to heat the recirculation loop.

13. The integrated gasification combined cycle system of claim 12, wherein the high pressure section comprises one or more economizers in communication with the diverted high pressure water flow.

14. The integrated gasification combined cycle system of claim 12, further comprising a syngas cooler in communication with the diverted high pressure water flow to create a high pressure steam flow.

15. The integrated gasification combined cycle system of claim 14, wherein the high pressure steam flow is in communication with the heat recovery steam generator.

16. The integrated gasification combined cycle system of claim 15, wherein the heat recovery steam generator comprises a high pressure evaporator and wherein the high pressure evaporator is in communication with the high pressure steam flow.

* * * * *